US006447739B1

(12) United States Patent
Krynitz et al.

(10) Patent No.: US 6,447,739 B1
(45) Date of Patent: Sep. 10, 2002

(54) METHOD FOR PRODUCING LITHIUM TRANSITION METALLATES

(75) Inventors: Ulrich Krynitz; Wolfgang Kummer, both of Goslar; Mathias Benz, Bergisch Gladbach; Juliane Meese-Marktscheffel, Goslar; Evelyn Pross, Albbruck; Viktor Stoller, Bad Harzburg, all of (DE)

(73) Assignee: H.C. Starck GmbH & Co. KG, Gosler (DE)

( * ) Notice: Subject to any disclaimer, the term of this patent is extended or adjusted under 35 U.S.C. 154(b) by 0 days.

(21) Appl. No.: 09/367,809

(22) PCT Filed: Feb. 9, 1998

(86) PCT No.: PCT/EP98/00697

§ 371 (c)(1),
(2), (4) Date: Aug. 19, 1999

(87) PCT Pub. No.: WO98/37023

PCT Pub. Date: Aug. 27, 1998

(30) Foreign Application Priority Data

Feb. 19, 1997 (DE) .......................... 197 06 343
Feb. 21, 1997 (DE) .......................... 197 07 050

(51) Int. Cl.$^7$ .................. C01D 15/00; C01G 49/00; C01G 37/14; C01G 45/12; H01M 4/88
(52) U.S. Cl. .................. 423/179.5; 423/594; 423/593; 423/596; 423/599; 252/182.1
(58) Field of Search ............... 423/594, 593, 423/596, 599, 179.5; 252/182.1

(56) References Cited

U.S. PATENT DOCUMENTS

| 4,440,867 A | * | 4/1984 | Sabherwal | ............ 502/62 |
| 4,567,031 A | | 1/1986 | Riley | ............ 423/593 |
| 4,980,080 A | | 12/1990 | Lecerf et al. | ............ 252/182.1 |
| 5,264,201 A | | 11/1993 | Dahn et al. | ............ 423/594 |
| 5,591,548 A | | 1/1997 | Mao | ............ 429/218 |
| 5,629,110 A | | 5/1997 | Kobayashi et al. | ............ 429/223 |
| 5,728,367 A | * | 3/1998 | Mao | ............ 423/593 |

FOREIGN PATENT DOCUMENTS

| DE | 19616861 | 4/1995 |
| EP | 0205856 | 12/1986 |
| EP | 0243926 | 11/1987 |
| JP | 07105950 | 10/1993 |

OTHER PUBLICATIONS

T. Nohma et al., Electrochemical characteristics of LiNiO$_2$ and LiCoO$_2$ as a positive material for lithium secondary batteries, Journal of Power Sources 54, 1995, 522–524.

Shuji Yamada et al., Synthesis and properties of LiNiO$_2$ as cathode material for secondary batteries, Journal of Power Sources 54, 1995, 209–213.

R.V. Moshtev et al., The LiNiO$_2$ solid solution as a cathode material for rechargeable lithium batteries, Journal of Power Sources 54, 1995, 329–333.

* cited by examiner

Primary Examiner—Steven P. Griffin
Assistant Examiner—Jonas N. Strickland
(74) Attorney, Agent, or Firm—Joseph C. Gil; Diderico van Eyl

(57) ABSTRACT

The invention relates to a method for producing lithium transition metalates of the general formula (I): $Li_x(M^1{}_yM^2{}_{1-y})_nO_{nz}$, where $M^1$ represents lithium, cobalt or manganese; $M^2$ represents cobalt, iron, manganese or aluminium and is not equal to $M^1$; n is equal to 2 if M1=M, and 1 in all other cases; x is a number between 0.9 and 1.2; y is a number between 0.5 and 1.0; and z is a number between 1.9 and 2.1. According to the method, an intimate solid mixture is produced of oxygen-containing compounds of the transition metals and oxygen-containing lithium compounds and this mixture calcinated in a reactor, whereby calcination takes place at least partly at an absolute pressure of less than 0.5 bar.

19 Claims, 1 Drawing Sheet

METHOD FOR PRODUCING LITHIUM TRANSITION METALLATES

Figure 1:
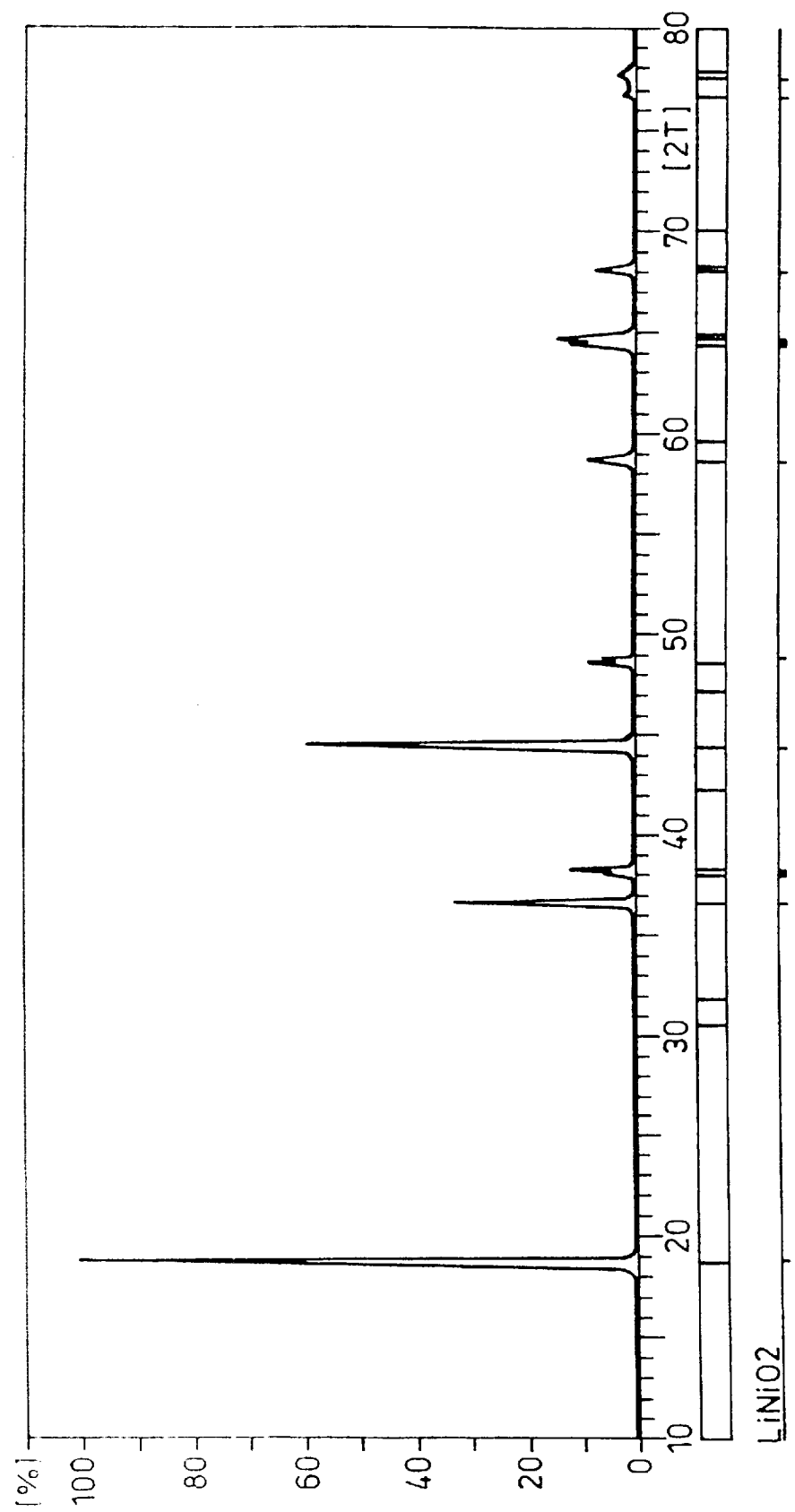

The present invention relates to a process for preparing lithium transition metallates of the general formula $$Li_x(M^1{}_yM^2{}_{1-y})_nO_{nz}$$

wherein
- $M^1$ represents nickel, cobalt or manganese,
- $M^2$ represents a transition metal which is different from $M^1$ and is chromium, cobalt, iron, manganese, molybdenum and/or aluminium,
- n is 2 if $M^1$ is manganese, and n is 1 if $M_1$ is nickel or cobalt, wherein
- x has a value from 0.9 to 1.2,
- y has a value between 0.5 and 1 and
- z has a value between 1.9 and 2.1.

These types of lithium transition metallates are used as electrode materials, in particular as cathode materials for non-aqueous lithium storage battery systems, so-called lithium ion batteries.

A number of proposals has already been made relating to methods of preparation of these types of lithium transition metallates, but these are mostly unsuitable for large-scale production or lead to products which have imperfect electrochemical properties.

The use of $LiCoO_2$ has recently gained acceptance, but this is extremely expensive due to the limited availability, and thus high price, of cobalt and is therefore not suitable for mass production (e.g. to provide the power for electrically operated vehicles). Therefore intensive efforts have already been made to replace some or all of the $LiCoO_2$ with, for instance, $LiNiO_2$ and/or $LiMn_2O_4$ as a cathode material.

Synthesis of the corresponding cobalt compound $LiCoO_2$ is generally regarded as a non-critical procedure. Due to the thermal stability of $LiCoO_2$, it is even possible, with this system, to react cobalt carbonate and lithium carbonate, as reaction components, directly at relatively high temperatures without troublesome concentrations of carbonate being left in the final product.

The transfer of this method to $LiNiO_2$ has been possible only at temperatures of 800 to 900° C. These high calcination temperatures, however, lead to partly decomposed lithium nickelates with relatively low storage capacities and/or unsatisfactory resistance to cyclic operation.

For this reason, carbonate-free mixtures are proposed for preparing $LiNiO_2$, in which, in most cases, β-nickel hydroxide is favoured as the nickel component, such as is described, for instance in U.S. Pat. No. 5,591,548, EP 0 701 293, J. Power Sources 54 (95) 209–213, 54 (95) 329–333 and 54 (95) 522–524. Moreover, the use of nickel oxide was also recommended in JP-A 7 105 950 and that of oxynickel hydroxide NiOOH in DE-A 196 16 861.

According to U.S. Pat. No. 4,567,031, the intimate mixture is prepared by co-precipitation of soluble lithium and transition metal salts from solution, drying the solution and calcining. Relatively finely divided crystals of the lithium transition metallate are obtained in this way at comparatively low calcining temperatures and within comparatively short times. The allocation of lithium and transition metal ions to particular layers in the crystal lattice, however, is greatly distorted so that, to a large extent, lithium ions occupy nickel layer lattice positions and vice versa. These types of crystals have unsatisfactory properties with regard to their use as electrodes in rechargeable batteries. Other processes (EP-A 205 856, EP-A 243 926, EP-A 345 707) start with solid, finely divided carbonates, oxides, peroxides or hydroxides of the initial metals. The intimate mixture is prepared by joint milling of the starting metals. The formation of lithium transition metallates takes place by solid diffusion during calcination. Solid diffusion requires comparatively high temperatures and comparatively long calcining times and does not generally lead to phase-pure lithium metallates with outstanding electronic properties. Extensive observations appear to prove that, in the case of the nickel system, decomposition of $LiNiO_2$ with the production of $Li_2O$ and NiO is initiated during prolonged thermal treatment at temperatures above about 700° C.

Therefore, in order to intensify the intimate mixing procedure, it has already been proposed, according to EP-A 468 942, to start the preparation of lithium nickelate with powdered nickel oxide or hydroxide, suspending the powder in a saturated lithium hydroxide solution and extracting the water from the suspension by spray drying. This should lead to a reduction in the calcining time and calcining temperature. Due to the relatively low solubility of lithium hydroxide in water, however, the homogeneity of this mixture is limited.

U.S. Pat. No. 5,591,548 proposes milling a powdered oxygen-containing transition metal compound with lithium nitrate and then calcining under an inert gas. The advantage of this process is the low melting point of lithium nitrate, 264° C., which means that intimate mixing takes place after heating to, for example, 300° C. in the form of a suspension of transition metal particles in molten lithium nitrate, which favours reaction with the solid.

The disadvantage of this process is that, during calcination, the gases released ($H_2O$, $NO_x$, $O_2$) do not escape, or escape only very slowly, from the viscous molten suspension so that the intimate contact required for the solid reaction and diffusion is hindered and on the other hand only a few suspended particles are present due to concentration inhomogeneities in the geometric spacing. Therefore, interruptions in the calcining process and intermediate milling to homogenise the reaction material are required.

According to the invention, it is now proposed that calcination be performed for at least some of the time under an at least partial vacuum. This produces a significant reduction in reaction times and temperatures required.

The invention therefore provides a process for preparing lithium transition metallates of the general formula $$Li_x(M^1{}_yM^2{}_{1-y})_nO_{nz}$$

wherein
- $M^1$ represents nickel, cobalt or manganese,
- $M^2$ represents a transition metal which is different from $M^1$ and is chromium, cobalt, iron, manganese, molybdenum and/or aluminium,
- n is 2 if $M^1$ is manganese, and n is 1 if $M^1$ is nickel or cobalt, wherein
- x has a value from 0.9 to 1.2,
- y has a value between 0.5 and 10 and
- z has a value between 1.9 and 2.1, by preparing an intimate mixture of finely divided, oxygen-containing compounds of the transition metals and one or more oxygen-containing lithium compounds and calcining the mixture in a reactor, which is characterised in that calcination takes place for at least some of the time under an absolute pressure of less than 0.5 bar absolute.

At least one of the lithium compounds preferably has a melting point of less than 600° C., in particular at least 90% of the lithium compounds used.

Calcination is preferably performed for at least some of the time under a partial vacuum corresponding to a pressure of 0.01 to 0.4 bar absolute, in particular at a pressure of 0.0 1 to 0.2 bar absolute.

Furthermore, it is also preferred that calcination be initially started at atmospheric pressure so that the molten lithium compound becomes supersaturated with dissolved gases resulting from the evolution of gases during reaction and still sub-stable bubble nuclei with diameters in the range of a few micrometers under atmospheric pressure are produced. This may take place, in industrial-scale batches, over a period of 2 to 12 hours, in the event that oxides are used as the transition metal compounds, or also over a longer period of time. The reactor is preferably evacuated, optionally also stepwise, only after this initial calcination stage under atmospheric pressure, so that, on the one hand, the volume of the bubble nuclei already present increases due to pressure reduction and, on the other hand, supersaturation of the molten material with dissolved gases and thus the diffusion pressure of the dissolved molecules in the direction of the gas bubbles is increased. Gas bubbles enlarged in this way, which have several times the volume of the suspended solid particles, come into contact with each other, coagulate and rise in the molten suspension until they are emitted into the reactor atmosphere at the surface of the suspension. The movement produced in this way in localised areas of the molten suspension leads to a degree of homogenisation of the reaction mixture which can only be produced, according to the prior art, by cooling the reaction mixture, milling and replacing in the reactor for further heat treatment.

If the gas release reaction has substantially ended, for example more than 99% of the releasable gases has been released, further calcination is preferably continued, according to the invention, at atmospheric pressure. The reaction is perfected during this third calcination stage by solid diffusion and possible lattice defects, which may have been caused by mechanical stresses under the partial vacuum, are rectified. The reaction product is present, in this third stage, as porous, largely open-pored "cakes".

If required, the third stage may be interrupted by a homogenising intermediate milling stage. However, this is not generally required if oxygen-containing transition metal compounds with a large surface area, if possible exceeding 50 m$^2$/g, were used during the preliminary preparation stages using the process described here. In this case, the reaction mixture retains its homogeneous character over all the stages.

According to the invention, a purge gas is passed through the reactor in order rapidly to remove the gases released during the reaction, preferably in all three calcination stages but in particular during the vacuum calcination stage. To avoid temperature differences across the reactor, the purge gas stream is preferably introduced in such a way that a low purge gas flow, for example less than 1 cm/sec, with respect to standard conditions, is produced in the reactor.

The transition from stage to stage may be performed smoothly and be regulated, for example, in accordance with the composition of the reaction gases.

The reaction-accelerating and homogenising effect of applying a vacuum according to the invention can be amplified by applying the vacuum in a pulsed manner, for example with a cycle of 1 to 15 minutes, in particular with a cycle of 5 to 15 minutes. The pressure variations due to pulsed application of a vacuum cause a "breathing" effect in the gas bubbles enclosed in the molten suspension and thus movement and homogenisation in localised regions in the reaction mixture. Pulsed application of a vacuum is preferably produced by using an internal pressure controlled valve on the vacuum pump with simultaneous introduction of the purge gas.

Preferred oxygen-containing lithium compounds with a melting point below 600° C. are lithium hydroxide with a melting point of 450° C., lithium nitrate with a melting point of 264° C., mixtures of lithium hydroxide and lithium nitrate or lithium nitrate hydrates.

Preferred oxygen-containing transition metal compounds according to the invention are hydroxides, since these provide a ready-made rhombohedral lattice with layered atomic positions into which the lithium ions can diffuse, after the elimination of water from the hydroxide crystals, with the production of largely element-pure layers. Due to their low reactivity, transition metal oxides are less preferred. However, their use is not excluded within the scope of the invention, in particular when oxides with very large specific surface areas are used. Furthermore, carbonates, hydroxy-carbonates and nitrates, optionally also containing water of crystallisation, are suitable according to the invention.

Preferred transition metals $M^1$ are nickel and manganese, in particular in the form of their hydroxides, especially those with a BET specific surface area of more than 5 m$^2$/g, in particular more than 20 m$^2$/g, quite specifically more than 50 m$^2$/g.

In the event that $M^1$ is Ni, β-nickel hydroxide, prepared according to U.S. Pat. No. 5,391,265/DE 42 29 295, is particularly preferred as a reaction component, since this has a BET surface area of 65 to 80 m$^2$/g and is able to absorb the concentrated lithium solution completely.

When using oxides or hydroxides with a much smaller surface area, e.g. spherical β-nickel hydroxide with a surface area of less than 5 m$^2$/g, some of the nickel oxide formed during the solid reaction settles out of the molten lithium nitrate or lithium hydroxide. The reaction mixture becomes inhomogeneous and phase-pure lithium metallates cannot be obtained without a homogenising, intermediate milling stage.

The powdered lithium and transition metal compounds are milled together in a manner known per se before use in the reactor and preferably compressed to form tablets in order to avoid dust and segregation. This also, on the one hand, increases the density, i.e. shortens the diffusion paths and, on the other hand, produces an effective gas-permeable bed. Intimate mixing is preferably achieved, instead of using a milling procedure, by suspending the powdered transition metal compound in a concentrated solution of the lithium compound followed by removal of water and then the production of tablets or pellets.

A LiNO$_3$ solution or a molten lithium nitrate hydrate salt with a LiNO$_3$ content of 50 to 80% is preferably used. The calculated amounts of transition metal compounds are stirred into this and the mixture is dried or spray dried to produce pellets at 120 to 200° C., for example in a heated mixer, while subjected to motion. Complete drying can be recognised, inter alia, by the fact that no lithium nitrate "bloom" is produced during subsequent heating in the reactor.

The process which is particulary preferred according to the invention uses lithium hydroxide, lithium hydroxide hydrate, lithium oxide or lithium carbonate, or mixtures thereof, as the starting materials for the lithium component. The starting materials are carefully introduced into preferably concentrated nitric acid. Nitric acid is used here in slightly more than stoichiometric amounts in order to reliably drive out any residual amounts of carbonate which may be present.

In practice the preferred procedure is to introduce the lithium starting material into concentrated nitric acid until the pH of the solution exceeds 7. The mixture is then acidified to pH 3.0 by adding nitric acid. Furthermore, the solution obtained is preferably evaporated at 120 to 170° C., optionally under a partial vacuum, wherein it is attempted to obtain a $LiNO_3$ content of 50 to 80% in the solution or molten salt. Then the calculated amounts of transition metal compounds are introduced and the mixture is dried or spray dried to produce pellets at 120 to 200° C. while subjected to motion.

Since, inter alia, nitrous gases are produced during calcination of this starting mixture, these have to be washed out of the vent gas and preferably converted directly into concentrated nitric acid. This nitric acid is then used again in accordance with the invention to prepare fresh lithium nitrate solution in the context of a complete recycling process.

The process for preparing an intimate mixture according to the invention is also of great advantage when conditions different from those according to the invention are used.

The calcination temperatures during the preparation of lithium nickelate, optionally modified by a concentration of $M^2$, are preferably between 550 and 700° C. In the case of the preferred three-stage calcination, the calcination temperature is preferably 580 to 680° C., in particular 600 to 650° C., wherein the temperature is increased in particular by a total of 10 to 30° C. over the course of the entire reaction. In the case of preparing lithium manganate, the preferred temperatures are 50 to 100° C. above the temperatures cited for lithium nickelate.

Calcination may be performed in a static bed, preferably with a bed depth of less than 100 mm. A moving bed, e.g. a rotary tubular furnace, may also be advantageously used for the calcination process.

Selection of the purge and transport gases depends on the reaction components used: if $M^{2+}$ compounds are intended to react with non-oxidising lithium compounds, e.g. lithium hydroxide or lithium carbonate, the use of an oxygen-containing purge gas is absolutely necessary. $N_2/O_2$ mixtures or $Ar/O_2$ mixtures are preferably used in this case, wherein the proportion of $O_2$ is 20 to 80%, in particular 30 to 50%. As an alternative, the use of air, preferably low-$CO_2$ air, or a mixture of air and oxygen is possible.

When using lithium nitrate, the oxygen required to oxidise $M^{2+}$ to $M^{3+}$ is formed in sufficient amounts by the decomposition of $NO_x$, produced during the reaction, so no further oxygen needs to be supplied. In this case, argon, nitrogen and/or water vapour are preferably used as purge gases in the first and second stages. For the third reaction stage (under atmospheric pressure), a certain concentration of $O_2$ is again required in the purge gas. It is expressly recommended that water vapour is not used as a purge gas in the third stage.

Although the invention has been described with reference to particular advantages relating to the use of low-melting lithium compounds, a person skilled in the art can easily recognise that calcination under reduced pressure is also advantageous when using non-melting reaction partners, e.g. a mixture of oxides and/or carbonates, due to the effective removal of gaseous elimination products.

EXAMPLES

Example 1

1.02 mol. $LiOH.H_2O$ were carefully dissolved in 1.03 mol. concentrated $HNO_3$. 1.00 mol. spherical $\beta$-$Ni(OH)_2$, which had been prepared in accordance with the example given in DE 4 342 620 C1 (18.5 $m^2/g$) BET, was stirred into this solution. The resulting suspension was then dried at 150° C. and homogenised.

The reaction mixture was heated for 8 hours at 320° C. under nitrogen and then milled and homogenised.

The mixture was then heated again slowly (rate of heating up: 2° C./min) and finally calcined for 24 hours at 610° C. in an atmosphere of 90% Ar/10% $O_2$, cooled and then milled and homogenised.

The material was then heated once more for 12 hours at 670° C. under oxygen.

The X-ray diffraction spectrum shows a phase-pure $LiNiO_2$ (FIG. 1).

Example 2

One mol. spherical nickel oxide (NiO), produced by the calcination at 280° C. of spherical nickel hydroxide $Ni(OH)_2$ which had been prepared in accordance with the example given in DE 4 342 620 C1, was mixed with 1.05 mol $LiOH.H_2O$ and intensively milled in a ball mill. The mixture was calcined for 24 hours at 500° C. under 50% Ar/50% $O_2$ and then milled and homogenised. It was then calcined again for 24 hours at 680° C. under 50% Ar/50% $O_2$ and the resulting product was milled.

The X-ray diffraction spectrum shows that a phase-pure $LiNiO_2$ was still not produced under these conditions. This was obtained only following aftertreatment for 24 hours at 700° C. under oxygen.

Example 3

One mol. spherical nickel oxide (NiO) in accordance with example 2 was impregnated with 1.05 mol. $LiOH.H_2O$, which had previously been dissolved in boiling water, dried at 150° C. and homogenised. The mixture was thermally treated in the same way as described in example 2 with the result that phase-pure $LiNiO_2$ was produced after calcination for 24 hours at 680° C. Further heat treatment was not required.

Example 4

101.0 mol. $LiOH.H_2O$ were carefully dissolved in 102.0 mol. concentrated $HNO_3$. Then this solution was evaporated down at 140° C. to a density of 1.50 g/ml. 100.0 mol. of normal nickel hydroxide (prepared in accordance with U.S. Pat. No. 5,391,265/DE 42 39 295, BET 73.4 $m^2/g$) were stirred into the hot solution or molten salt. The suspension was dried in a heated mixer at 150° C. and pelletised.

10 kg of the mixture prepared in this way were heated to 600° C. in a gas-tight tubular furnace under 100 l/h of $N_2$ and held at this temperature for 6 hours.

Then the temperature was increased to 650° C. and 100 l/h of $N_2$ were passed into the furnace as purge gas.

When processing comparable batches using small amounts (0.2 to 1.0 kg) the reaction, visible due to the emission of $NO_x$, had completely finished after about 12 to 36 h, but with this 10 kg batch it was shown that even after 4 days (96 h) $NO_x$ was still being continuously evolved, i.e. the reaction had still not finished. Only after a further 50 h at a reaction temperature increased to 685° C. had the reaction obviously terminated, i.e. no more $NO_x$ emissions could be seen. The mixture was then aftertreated for a further 6 hours at 640° C. under 50 l/h of $N_2$ and 50 l/h of $O_2$.

The resulting lithium nickelate still contained 0.43% $NO_3^-$ and a second phase ($Li_2O$) was detectable in the X-ray diffraction spectrum, this being due to partial decomposition of LiNiO$_2$ during the extremely long reaction time combined with the relatively high reaction temperature.

Example 5

10 kg of an intimate preliminary mixture prepared in the same way as in example 4 were first further processed at 600° C. for 6 h at atmospheric pressure under an atmosphere of 100 l/h of N$_2$ and 20 l/h of O$_2$.

Then the temperature was increased to 640° C. and the pressure within the furnace was first reduced to 0.5 bar and then, after 30 minutes, reduced to 0.08 bar. At the same time 100 l/h of N$_2$ and 20 l/h of O$_2$ were supplied via a capillary from the "rear face" of the furnace.

After about 16 h, visible emissions of NO$_x$ were no longer detectable and the vacuum pump was switched off.

After a further 4 h of heat treatment at 640° C. at atmospheric pressure (50 l/h of N$_2$ plus 50 l/h of O$_2$), the reaction had finished completely.

The resulting lithium nickelate contained only 18 ppm of nitrate and the X-ray diffraction spectrum (FIG. 2) showed that the product was a phase-pure lithium nickelate.

In comparison with example 4, the reaction time was a total of 70% shorter and the product was not subjected, at any time, to temperatures higher than 640° C.

Example 6

The test conditions in example 5 were repeated, wherein, however, no oxygen at all was supplied during the first calcination stage (6 g/600° C.) and the second calcination stage (16 h/640° C./partial vacuum).

The result was identical to that obtained in example 1, i.e. a phase-pure LiNiO$_2$ which contained only 16 ppm of nitrate was obtained.

Example 7

Example 6 was repeated, but using a "pulsed vacuum" in the second reaction stage. This was achieved by activating an automatically operated cut-off valve installed in the vacuum pipe in such a way that the vacuum pipe was sealed when the pressure dropped below 0.08 bar absolute (measured inside the furnace chamber) and opened again when the pressure reached 0.5 bar.

The pressure build-up inside the (vacuum-tight!) furnace chamber in this case took place on the one hand due to the continuous emission of reaction gases from the reaction mixture and on the other hand due to a steady flow of purge gas (N$_2$), as a result of which a pulse frequency of about 8 min was set up.

Since no more NO$_x$ production could be detected after about 12 hours, the pulsed vacuum was switched off after a total of 13 hours and the product was aftertreated in the way described in example 5.

The result was identical to that obtained in example 5 and example 6: a phase-pure LiNiO$_2$ was obtained, but with an even shorter reaction time. The nitrate content was determined as 15 ppm.

What is claimed is:

1. A process for preparing lithium transition metallates of the general formula $Li_x(M^1{}_yM^2{}_{1-y})_nO_{nz}$
wherein M$^1$ represents nickel, cobalt or manganese, M$^2$ represents chromium, cobalt, iron, manganese, molybdenum or aluminum and is not the same as M$^1$, n is 2 if M$^1$ is manganese, otherwise 1, x is a number between 0.9 and 1.2, y is a number between 0.5 and 1.0 and z is a number between 1.9 and 2.1, comprising preparing an intimate solid mixture of oxygen-containing compounds of the transition metals and oxygen-containing lithium compounds, wherein the oxygen-containing lithium compounds include at least one lithium compound with a melting point that is below about 600° C., and calcining the intimate, solid mixture in a reactor, wherein the intimate solid mixture includes a molten lithium compound and calcination takes place for at least some of the time under a pressure of less than about 0.5 bar absolute.

2. A process according to claim 1 wherein calcination takes place for at least some of the time, under a partial vacuum corresponding to a pressure that ranges from about 0.01 to about 0.4 bar absolute.

3. A process according to claim 1, wherein calcination is performed in several stages, wherein atmospheric pressure is used in a first stage, a partial vacuum is used in a second stage and atmospheric pressure is used in a third stage.

4. A process according to claim 3, wherein the partial vacuum is pulsed with a cycle of 1 to 15 minutes.

5. A process according to claim 3, wherein a component selected from the group consisting of inert gases (N$_2$, Ar, He), water vapour, low-CO$_2$ air and oxygen are used as purge gases during the first and second reaction stages.

6. A process according to claim 3, wherein oxygen, an inert gas and/or air are used as purge gases during the first and second reaction stages.

7. A process according to claim 1, wherein the intimate solid mixture is prepared by impregnating sparingly soluble transition metal compounds with highly concentrated lithium nitrate solution followed by a drying procedure.

8. A process according to claim 7, wherein drying takes place in a spray dryer or a heated mixer.

9. A process according to claim 8, wherein the intimate mixture consists of pellets or micropellets.

10. A process according to claim 7, wherein lithium nitrate solutions or molten salts of lithium nitrate hydrates are used as highly concentrated lithium salt solutions.

11. A process according to claim 10, wherein the highly concentrated lithium salt solutions are obtained by dissolving lithium carbonate and/or lithium hydroxide in concentrated nitric acid and then evaporating down the reaction solution.

12. A process according to claim 11, wherein the NO$_x$ released during calcination is converted into concentrated nitric acid and used to dissolve lithium carbonate and/or lithium hydroxide.

13. A process according to claim 7, wherein transition metal compounds are used which are either oxidic or else eliminate water during decomposition.

14. A process according to claim 13, wherein the transition metal compounds have a BET specific surface area of more than 10 m$^2$/g.

15. A process according to claim 7 wherein No$_x$ released during calcination is converted into nitric acid and converted into concentrated nitric acid and used to dissolve a lithium compound selected from the group consisting of lithium carbonate and lithium hydroxide.

16. A process according to claim 1, wherein calcination is performed in a moving bed.

17. A process for preparing lithium transition metallates of the general formula:

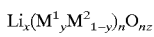

wherein

M¹ represents nickel, cobalt or manganese,

M² represents chromium, cobalt, iron, manganese, molybdenum or aluminum and is not the same as M¹, N is 2 if M¹ is manganese, otherwise 1, X is a number between 0.9 and 1.2, Y is a number between 0.5 and 1.0 and Z is a number between 1.9 and 2.1, by preparing an intimate solid mixture of oxygen-containing compounds of the transition metals and oxygen-containing lithium compounds and calcining the intimate, solid mixture in a reactor, characterized in that calcination takes place for at least some of the time under a pressure of less than 0.5 bar absolute, and wherein the calcination is performed in stages of first, atmospheric pressure, then partial vacuum, then atmospheric pressure, with a pulse cycle of 1 to 15 minutes during the partial vacuum stage and passage of a purge gas through the reactor during calcination.

18. Process according to claim 17 wherein a purge gas selected from the group consisting of $N_2$, Air and oxygen is used during the first (atmospheric pressure) and second (partial vacuum) stage of calcination and a purge gas selected from the group consisting of oxygen, $N_2$, Ar, He and air is used as a purge gas during the third (atmospheric pressure) stage of calcination.

19. The process of claim 17 wherein the original intimate solid mixture is prepared by impregnating one or more low solubility transition metal compounds with highly concentrated lithium nitrate solution and drying.

* * * * *